United States Patent Office 3,123,561
Patented Mar. 3, 1964

3,123,561
BIS(HYDROXYPHENYL) ETHERS OF POLY-
ALKYLENE GLYCOLS
Howard M. Rue, Media, Pa., assignor to Sun Oil Company, Philadelphia, Pa., a corporation of New Jersey
No Drawing. Filed Jan. 4, 1961, Ser. No. 80,557
4 Claims. (Cl. 252—33.3)

This invention relates to new compositions of matter and to procedure for preparing these compositions.

The new compounds according to the invention are ethers of polyalkylene glycols with aromatic compounds having a phenolic hydroxyl group. Two aromatic rings with phenolic hydroxyls are present in the molecule, being attached to the polyalkylene glycol portion of the molecule through ether linkages.

The compounds exhibit properties characteristic of phenolic compounds, as a result of the two phenol groups in the aromatic portions of the molecule, and also exhibit water solubility characteristics which are attributable to the presence of the ethoxy groups in the polyalkylene glycol portion of the molecule.

In certain uses, as subsequently more fully described, the combination of the phenolic characteristics with the water solubility characteristics provides new and beneficial results.

The compounds according to the invention are bis(hydroxyphenyl) ethers of polyalkylene glycols. Preferably they have the following formula:

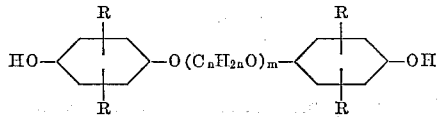

where R is selected from the group consisting of hydrogen, halogen atoms and alkyl radicals having 1 to 8 carbon atoms, $m$ is an integer from 2 to 30 and $n$ is an integer from 2 to 3.

The hydroxyl groups in the compounds according to the invention are preferably in the para position with respect to the ether linkages, as in the preferred compounds represented by the preceding formula. However, compounds wherein the hydroxyls are in the ortho and meta position relative to the ether linkages are also within the scope of the invention.

The R radicals in the preceding formula can be either straight or branched chain alkyl radicals. In certain uses, such as for inhibition of oxidation, it is desirable to have two tertiary alkyl radicals in the ortho positions relative to the phenolic hydroxyl in each of the aromatic radicals in the molecule.

The compounds are prepared according to the invention by contacting a salt of a polyalkylene glycol with a salt of a halophenol. Alkali metal salts of the glycol and of the halophenol are typically employed, and ether linkages are formed at each end of the glycol molecule, with the elimination of alkali metal halide. The inorganic salt which is formed is then separated from the ether product which is obtained.

In a preferred embodiment, the glycol salt which is employed in the reaction has the following formula: $MO(C_nH_{2n}O)_mM$ where M is alkali metal and $m$ and $n$ are as previously specified. Alkali metal salts of polyethylene glycols, or of polypropylene glycols, or of ethylene oxide-propylene oxide copolymers are suitably employed.

In a preferred embodiment, the alkali metal salt of halophenol which is employed in the reaction has the following formula

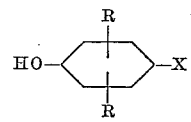

where R is as previously specified, and X is halogen. Examples of suitable compounds are parachlorophenol, para-bromophenol, 2,6-ditertiarybutyl-4-chlorophenol, 2,4,5-trichlorophenol, etc.

The temperature of the reaction is an elevated temperature suitable for reaction of the organic salts with formation of alkali metal halide. Preferably it is at least 150° F. and more preferably in the range from 200 to 350° F. Higher temperatures which do not result in excessive decomposition of reactants or products can be employed. Atmospheric pressure is suitable but other pressures can be employed if desired.

The process according to the invention can be performed if desired in the presence of a suitable solvent. The known solvents for organic synthesis are generally suitable. Where a solvent is employed, the reaction mixture, following the process, generally separates into a solvent phase and a separate phase containing alkali metal salts of starting materials and reaction products.

Typically, in the working up of the reaction products, the alkali metal salts, after separation from solvent if any, are acidified by contact with aqueous inorganic acid, e.g., sulfuric acid, hydrochloric acid, etc. to obtain an aqueous phase containing inorganic salt and an organic liquid phase containing liberated hydroxyl compounds. The phases are separated, and phenolic reaction product is recovered from the organic liquid phase. The aqueous phase may also contain phenolic reaction products, in varying amounts depending upon the water solubility of the reaction product. The water solubility of the product depends in turn upon the number of oxyethylene groups in the molecule and other factors. The phenolic reaction product is recovered from the respective phases by suitable procedure such as distillation, solvent extraction, precipitation etc., within the ability of a person skilled in the art.

The phenolic reaction product obtained in the process is largely a diether product of reaction between two moles of halophenol salt and one mole of polyalkylene glycol salt, and this is apparently the case even though the respective reactants are initially contacted in substantially equimolar amounts. It is generally preferred to use a substantially stoichiometric amount of the respective reactants for the production of diether, though an excess of either reactant can be employed if desired. Typically, but not necessarily, the amount of the polyalkylene glycol salt is in the range from 0.25 to 1.0 mole per mole of the halophenol salt.

The alkali metal salt of polyalkylene glycol which is employed as reactant can be prepared by any suitable known procedure, such as the reaction of polyalkylene glycol with free alkali metal, e.g., sodium metal, potassium metal, etc.

The compounds according to the invention are useful as bacteria-controlling additives in various environments, and are particularly useful for controlling bacteria in emulsions of petroleum oil in water, as commonly employed for metal cutting fluids, rolling oils etc. The compounds can be employed as the free phenol, but it is common practice to employ phenolic bacteria-controlling additives in the salt form. Alkali metal or aliphatic amine salts can be employed.

An advantage of the compounds according to the invention in such use resides in the fact that, even in the free phenol form, the compounds exhibit a relatively high water solubility. Under typical conditions of use, emulsions containing salts of phenolic compounds frequently become acidified to the extent that the salts of the phenol are converted to free phenol. In many cases, this results in poor solubility of the bacteria-controlling additive in the aqueous phase, and consequently in reduced effectiveness of the additive in controlling bacteria.

According to the present invention, however, the number of oxyethylene groups in the molecule can be adjusted to provide an increased extent of water solubility of the free phenol. Consequently the liberation of free phenol does not excessively impair the bacteria-controlling characteristics, and satisfactory control is obtained with the free phenol as well as with the phenol salt.

Emulsifiable compositions and emulsions thereof, in which the bacteria-controlling material according to the invention is advantageously used, contain mineral oil and emulsifying agent, and preferably contain mineral oil, carboxylic acid salts and sulfonic acid salts. The invention is generally applicable to the known emulsifiable compositions containing mineral oil and soaps, and the known soaps for this purpose are generally suitable.

The mineral oil is preferably employed in the amount of 70 to 90 weight percent of the total composition on the anhydrous basis, and is usually a lubricating oil distillate having viscosity within the range from 50 Saybolt Universal seconds at 100° F. to 300 Saybolt Universal seconds at 210° F.

Carboxylic acid salts are employed in a preferred embodiment in amount from 6 to 12 weight percent of the total emulsifiable composition on the anhydrous basis, and are usually alkali metal or aliphatic amine salts of aliphatic or cycloaliphatic carboxylic acids, which acids have 12 to 30 carbon atoms per molecule. The carboxylic acid salts are conventional components of emulsifiable mineral oil compositions, and any of the known salts can be employed. Typical carboxylic acids for the formation of such salts are the fatty acids, petroleum naphthenic acids, acids produced by liquid phase partial oxidation of aliphatic or naphthenic hydrocarbons, or of mixtures containing aliphatic and naphthenic hydrocarbons, e.g., de-aromatized petroleum fractions. In preferred embodiments of the invention, the carboxylic acid salts which are employed constitute a mixture of salts of petroleum naphthenic acids and salts of acids produced by liquid phase partial oxidation of a solvent-refined mixture of lubricating oil and low-melting wax, i.e., wax having melting point below 100° F. Such mixtures are described in more detail in Patent No. 2,797,197 which issued on June 25, 1957, to Norman Thompson and Willard K. Parcells.

The sulfonic acid salts which are employed in the composition in one embodiment are also conventional components of emulsifiable mineral oil compositions. Preferably the amount of sulfonic acid salts in in the range from 2 to 4 wt. percent of the composition. Preferably the average molecular weight of the sulfonic acids which are employed to make the salts is within the approximate range from 425 to 525. Alkali metal of aliphatic amine salts of the sulfonic acids can be employed. The sulfonic acids are generally produced by the sulfonation of a solvent-refined petroleum lubricating oil in a manner which is well known in the art.

Suitable alkali metals and amines for the sulfonic and carboxylic salts include those which are known in the art for soluble oil emulsifying agents, e.g., sodium, potassium, lithium, isopropylamine, isopropanolamine, triethanolamine, etc. Usually the amine has 2 to 12 carbon atoms per molecule.

The total amount of emulsifying agent in the composition is preferably in the range from 7.5 to 15 wt. percent on the anhydrous basis.

Frequently, the emulsifiable mineral oil compositions contain, in addition to the components referred to previously, a coupling agent or mutual solvent which improves the stability of the emulsifiable composition prior to emulsification or of the emulsion produced therefrom or both. Many mutual solvents are known in the prior art, and the known mutual solvents are generally suitable for use according to the invention.

The emulsifiable mineral oil composition frequently contains a small amount of water, usually in the range from 1 to 5 weight percent of the total composition prior to emulsification.

Preferably the emulsifiable mineral oil composition contains a small amount of free alkali, e.g., in the range from 0.01 to 0.2 weight percent as sodium hydroxide. It is within the scope of the invention, however, to prepare emulsifiable compositions which are on the acid side rather than the alkaline side.

Typically, the emulsifiable compositions of the invention are emulsified by agitating with hard or soft water at a temperature in the range from 45 to 180° F. to give emulsions containing 1 to 10 weight percent of the non-aqueous constituents. However, other proportions and procedures can be employed.

The bacteria-controlling composition according to the invention is preferably employed, in emulsions as above described, in amount from 0.1 to 5 wt. percent based on the oil phase.

The following examples illustrate the invention.

*Example 1*

The following materials are charged to a one-liter three-necked flask fitted with condenser:

| | | |
|---|---|---|
| Tetraethylene glycol | ml | 68 |
| Sodium metal | g | 7.7 |
| p-Xylene | ml | 400 |

The mixture is stirred at room temperature, then allowed to stand overnight. The sodium reacts wtih the tetraethylene glycol to produce tetraethylene glycol monosodium salt.

To the flask are added 50 g. of sodium p-chlorophenate. The mixture is stirred, then heated to 240° F. for three hours. The mixture is then cooled to room temperature and allowed to separate into two layers. The upper layer is believed to be primarily xylene, the lower layer primarily the sodium salts of the oxygen-containing reactants and products.

The lower layer is separated from the upper layer, then washed with xylene and dissolved in water. Sulfuric acid is then added to the aqueous solution to liberate phenolic and glycol compounds and produce sodium sulfate. An organic layer separates from the aqueous salt solution.

The separated organic layer, a colorless liquid having pour point below 35° F., contains the bis(hydroxyphenyl) ether of tetraethylene glycol. Infra-red analysis of the organic layer indicates the absence of compounds having a hydroxyl group at the end of an aliphatic carbon chain; this indicates the absence of the mono(hydroxyphenyl) ether of tetraethylene glycol. The organic layer is also essentially free of chlorine, indicating the absence of p-chlorophenol. The amount of bis(hydroxyphenyl) ether of tetraethylene glycol in the separated aqueous phase is relatively small, though the four oxyethylene groups in the molecule provide greater water solubility than would otherwise be the case.

Example 2

The procedure of Example 1 is followed, except that two moles of sodium metal per mole of tetraethylene glycol are employed, thereby to obtain tetraethylene glycol disodium salt, and two moles of sodium p-chlorophenate are employed per mole of tetraethylene glycol disodium salt. The procedure is otherwise the same as in Example 1, and the results are essentially the same, except that a greater amount of sodium sulfate is produced.

Example 3

The following composition is prepared:

|  | Volume percent |
|---|---|
| Petroleum lubricating oil | 79.1 |
| Petroleum naphthenic acids | 9.4 |
| Petroleum sulfonic acid salts | 4.3 |
| Partially oxidized petroleum foots oil | 4.6 |
| 50° Bé. caustic soda | 1.6 |
| 2-methyl pentanediol | 1.0 |

The caustic soda neutralizes the naphthenic acids and the oxidized foots oil and provides about 0.05–0.1 wt. percent of free sodium hydroxide. The water content of the composition is adjusted to about 2.5 wt. percent.

The petroleum lubricating oil is a distillate from naphthenic base crude, the distillate having Saybolt Universal viscosity of 110 seconds at 100° F.

The petroleum naphthenic acids have saponification number of about 140 mg. of KOH per gram, indicating average molecular weight of about 400. In distillation at 2 mm. of Hg, the 10% point and 95% point of the acids are about 350° F. and 550° F. respectively.

The petroleum sulfonic acid salts are sodium salts of acids obtained by contacting 85% raffinate from furfural refining of lubricating oil with about 14 lb. of anhydrous $SO_3$ per barrel of oil at ambient temperature, separating oil-insoluble sulfonic acids from the product, extracting sodium salts of the oil-soluble sulfonic acids from the oil with aqueous isopropanol, and stripping off solvent to obtain the sodium salts of the sulfonic acids. The sulfonic acids have average molecular weight of about 450.

The partially oxidized foots oil is obtained by liquid phase partial oxidation of foots oil obtained from paraffinic-naphthenic base crude. The foots oil is a filtrate obtained in the solvent deoiling of distillate slack wax. It has Saybolt Universal viscosity at 100° F. of about 136 seconds, contains about 40% of wax and conforms generally to the foots oil described in Patent No. 2,797,197 which issued on June 25, 1957, to Norman Thompson and Willard K. Parcells. The partial oxidation is conducted in the manner described in that patent and results in a product having saponification number of about 75 mg. of KOH per gram.

The emulsifiable composition prepared as described above is stirred into tap water to form a 5% emulsion of the composition in water.

In order to determine the effectiveness of bacteria-controlling compounds against bacteria normally encountered in the use of such emulsions as metal cutting fluids, under pH conditions commonly encountered in such use, the pH of the emulsion is adjusted to 7.5–8.0 with mineral acid, and the emulsion is inoculated with 10 parts per volume, per 90 parts of emulsion, of a spoiled emulsion resulting from use in commercial metal cutting operations of an emulsion of an emulsifiable composition having essentially the same composition as that described above. The spoiled emulsion contains bacteria of the *Pseudomonas aeruginosa* and *oleovorans* varieties.

Disodium salt of bis(hydroxyphenyl) diether of tetraethylene glycol, as prepared in Example 1, is added to the inoculated emulsion in amount of 1000 p.p.m. based on total emulsion. The emulsion is then allowed to stand at room conditions and compared periodically with a blank containing no bacteria-controlling additive. The blank quickly develops a blue discoloration and a strong sewer gas odor. The emulsion containing the compound according to the invention remains, and is after several months, essentially colorless and odor-free, indicating that the compound prevents the discoloration and odor which would otherwise be caused by the bacteria.

Example 4

The procedure of Example 1 is repeated, using however polyethylene glycol having an average of 12 oxyethylene groups per molecule in place of the tetraethylene glycol of Example 1. Generally similar results are obtained; the product, bis(hydroxyphenyl) ether of polyalkylene glycol, has greater solubility in water than the product of Example 1, and therefore appears in greater quantity in the aqueous phase obtained upon acidifying. In emulsions prepared as described in Example 3, the product of the present example has highly effective action in controlling bacteria and, because of its greater solubility in water, has, in the free phenolic form, greater concentration in the aqueous phase than the product of Example 1. Therefore, when lowered pH results in conversion of alkali metal salt of the phenolic additive to the free phenolic form, the additive of the present example is more effective in the aqueous phase than the additive of Example 1.

The bis(hydroxyphenyl) ethers of polyalkylene glycols according to the invention are useful in various applications of bis-phenolic compounds, e.g., as oxidation inhibitors, fungicides, monomers for the production of polycarbonate resins, epoxy resins, polyester resins, etc.

The invention claimed is:

1. As a composition of matter, an emulsifiable mixture of petroleum lubricating oil, soap and a compound selected from the group consisting of alkali metal and aliphatic amine salts of a bis(hydroxyphenyl) ether of polyalkylene glycol having the general formula

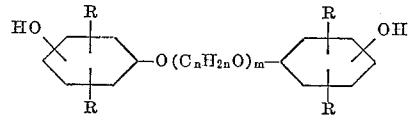

wherein R is selected from the group consisting of hydrogen, halogen, and alkyl radicals having from 1 to 8 carbon atoms, $m$ is an integer from 2 to 30, and $n$ is an integer from 2 to 3, said compound being present in a bacteria-controlling amount.

2. An emulsifiable mineral oil composition having the following components in the indicated ranges of proportions:

|  | Weight percent |
|---|---|
| Carboxylic acid salts | 6 to 12 |
| Sulfonic acid salts | 2 to 4 |
| Mineral oil | 70 to 90 |
| Bacteria-controlling compound | 0.1 to 5 | said carboxylic acid salts being selected from the group consisting of alkali metal and aliphatic amine salts of carboxylic acids selected from the group consisting of aliphatic and cycloaliphatic carboxylic acids having 12 to 30 carbon atoms per molecule, said sulfonic acid salts being selected from the group consisting of alkali metal and aliphatic amine salts of alkyl aromatic sulfonic acids having average molecular weight in the range from 425 to 525, said mineral oil being a petroleum lubricating oil having Saybolt Universal viscosity in the range from 50 seconds at 100° F. to 300 seconds at 210° F., and said bacteria-controlling compound being selected from the group consisting of alkali metal and aliphatic amine salts of bis(hydroxyphenyl) ethers of polyalkylene glycol having the general formula

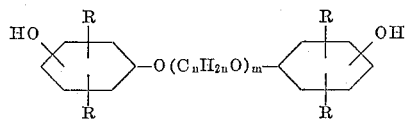

wherein R is selected from the group consisting of hydrogen, halogen, and alkyl radicals having from 1 to 8 carbon atoms, $m$ is an integer from 2 to 30, and $n$ is an integer from 2 to 3.

3. As a new composition of matter, a 1 to 10 percent emulsion of the composition of claim 2 in water.

4. An oil-in-water emulsion consisting essentially of petroleum lubricating oil, an emulsifying agent, water, and from 0.1 to 5.0 percent based on the weight of the oil of a compound selected from the group consisting of alkali metal and aliphatic amine salts of a bis(hydroxyphenyl) ether of a polyalkylene glycol having the general formula

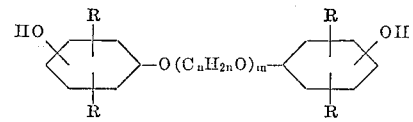

wherein R is selected from the group consisting of hydrogen, halogen, and alkyl radicals having from 1 to 8 carbon atoms, $m$ is an integer from 2 to 30, and $n$ is an integer from 2 to 3.

References Cited in the file of this patent

UNITED STATES PATENTS

| | | |
|---|---|---|
| 2,098,204 | Bruson | Nov. 2, 1937 |
| 2,668,146 | Cafcas et al. | Feb. 2, 1954 |
| 2,764,549 | Cook et al. | Sept. 25, 1956 |
| 2,770,594 | Jezl | Nov. 13, 1956 |
| 2,782,240 | Hefner et al. | Feb. 19, 1957 |
| 2,856,434 | Niederhauser et al. | Oct. 14, 1958 |
| 2,903,485 | Lane et al. | Sept. 8, 1959 |
| 3,013,973 | Bennett | Dec. 19, 1961 |